(12) United States Patent
Nyc et al.

(10) Patent No.: US 9,426,938 B2
(45) Date of Patent: Aug. 30, 2016

(54) DEVICE FOR FOLDING THE WORKING PARTS OF AGRICULTURAL MACHINERY

(71) Applicant: FARMET a.s., Ceska Skalice (CZ)

(72) Inventors: Michal Nyc, Cerveny Kostelec (CZ); Jakub Jelinek, Rychnovek (CZ); Tomas Smola, Chvalkovice (CZ)

(73) Assignee: FARMET a.s., Ceska Skalice (CZ)

( * ) Notice: Subject to any disclaimer, the term of this patent is extended or adjusted under 35 U.S.C. 154(b) by 0 days.

(21) Appl. No.: 14/386,935

(22) PCT Filed: Mar. 14, 2013

(86) PCT No.: PCT/CZ2013/000039
§ 371 (c)(1),
(2) Date: Sep. 22, 2014

(87) PCT Pub. No.: WO2013/139315
PCT Pub. Date: Sep. 26, 2013

(65) Prior Publication Data
US 2015/0047863 A1 Feb. 19, 2015

(30) Foreign Application Priority Data
Mar. 23, 2012 (CZ) .............................. PV2012-205

(51) Int. Cl.
*A01B 73/04* (2006.01)

(52) U.S. Cl.
CPC .................... *A01B 73/044* (2013.01)

(58) Field of Classification Search
CPC .............................. A01B 73/04; A01B 73/044
See application file for complete search history.

(56) References Cited

U.S. PATENT DOCUMENTS

| 3,944,001 | A | | 3/1976 | Warner et al. | |
|---|---|---|---|---|---|
| 4,023,623 | A | * | 5/1977 | Anderson | A01B 73/044 172/311 |
| 4,050,523 | A | * | 9/1977 | Poland | A01B 73/044 172/311 |
| 4,271,711 | A | | 6/1981 | Vavra | |
| 4,281,720 | A | * | 8/1981 | Tusing | A01B 73/04 16/346 |
| 4,336,846 | A | * | 6/1982 | Boetto | A01B 73/044 172/311 |
| 4,342,367 | A | * | 8/1982 | Gates | A01B 73/04 172/311 |
| RE31,209 | E | * | 4/1983 | Anderson | A01B 73/044 172/311 |
| 4,418,763 | A | | 12/1983 | Boetto | |
| 4,453,601 | A | | 6/1984 | Orthman et al. | |
| 5,573,070 | A | * | 11/1996 | Meek | A01C 7/208 111/33 |

OTHER PUBLICATIONS

International Search Report for corresponding patent application No. PCT/CZ2013/000039 dated Jun. 28, 2013.

* cited by examiner

*Primary Examiner* — Matthew D Troutman
(74) *Attorney, Agent, or Firm* — Renner, Otto, Boiselle & Sklar, LLP

(57) ABSTRACT

A device for folding the working parts of agricultural machinery, in particular a device for folding the working parts of an agricultural machine consisting of at least one stationary part (1) and at least one, stored in the stationary part (1), swiveling folding part (2), where the stationary part (1) and the folding part (2) are connected by at least one swivel connection (3) stored in their outer edges, which contains, in the stationary part (1) stored a linear drive device (5) pivotally connected to a rod (4) which is pivotally connected to the folding part (2), where the linear drive device (5) is located below the frame (12) of the stationary part (1).

7 Claims, 7 Drawing Sheets

DEVICE FOR FOLDING THE WORKING PARTS OF AGRICULTURAL MACHINERY

Figure 1:
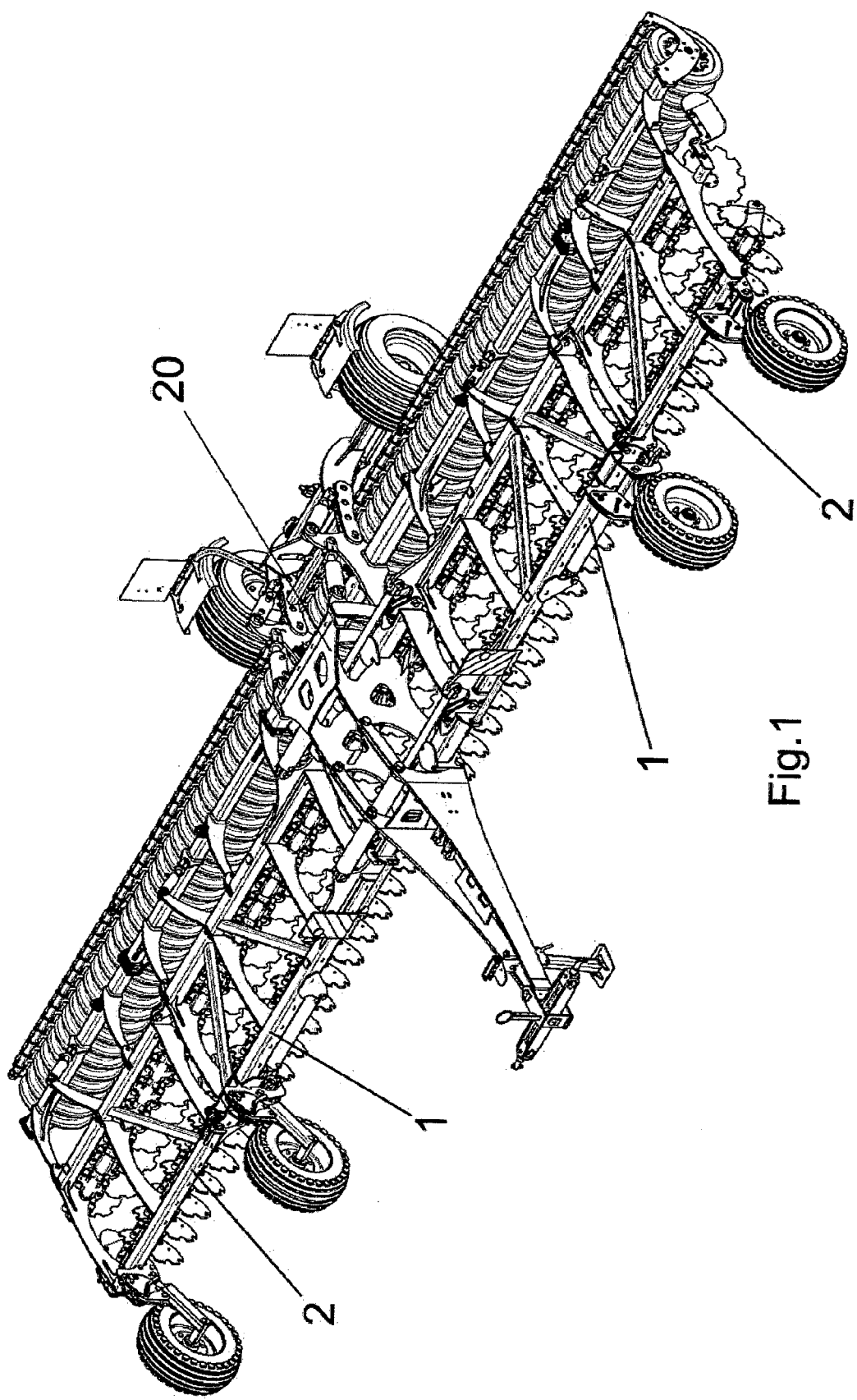

This application is a national phase of International Application No. PCT/CZ2013/000039 filed Mar. 14, 2013 and published in the English language.

TECHNICAL FIELD

The invention relates to a device for folding the working parts of agricultural machinery, particularly equipment for folding the working parts of an agricultural machine comprising at least one stationary part and at least one 180° swiveling part stored within a folding part.

STATE OF THE ART

Currently, folding of the side arms by 180° from the working position to the transport position mainly uses the following principles.

For the first type, the swivel point is located upon the edges of the frame of the stable and swivel parts of the machine. Furthermore, the stable and swivel parts contain hook attachment points, which are below the level of the horizontal swivel point and are also at some distance from the vertical swivel point. Two rods are at the opposite upper edge of the frame and are connected by one opening through which a control piston rod is connected. The piston rod is attached at the opposite end above the stationary frame.

The second type is similar to the first type, however the control rod fixed to the swiveling part of the machine is longer than the control rod fixed to the stationary part. These are mutually connected in such a way that the end of the longer rod extends beyond the shorter rod. The longer rod also extends beyond the opening for attachment of the control rod. The advantage of the second type of folding over the first is a far lower power requirement for folding the machine.

The disadvantage of both options is the large space requirement for mounting the control piston rod and its whole mechanism, thereby adversely increasing the clearance height. Given that the total width for road transport should not exceed 3 m and the height 4 m, the machine width is thus limited. Generally, a machine with one stationary arm and two folding arms is limited to a maximum width of 5.5 m.

The aim of the invention is the construction of a folding mechanism, which allows trouble free tilting of the folding parts of the machine by 180° onto the stationary part, so as to be strong, statically stable, and yet simple and cheap to produce, and allowing increased machine working widths while respecting road transport width restrictions.

PRINCIPLE OF THE INVENTION

The afore mentioned deficiencies are for the most part removed and the aim of the invention met by a device for folding the working parts of agricultural machinery, in particular, device for folding the working parts of an agricultural machine comprising at least one stationary part and at least one swiveling folding part, where the stationary part and the folding part are connected by at least one swivel connection mounted on their edges, which, according to the invention, is characterized in that it contains on the stationary part a linear drive device pivotally connected to a rod, which is pivotally connected to the folding part where the linear drive device is located below the frame of the stationary part. The advantage of this structural arrangement lies in the fact that clearance height of the machine frame is not increased thus enabling construction of machines with greater working widths which, when folded, meet the size and width requirements for road transport. Any potential lengthening of the rod can also positively influence power ratios thus making lower demands on the linear drive device.

It is preferable that the rod, in the course of folding or unfolding the folding parts, rests upon a rotary stop located in the stationary part whereas the rotary stop is preferably located on a shaft of the swiveling connection. The above provide for very stable tilting of the folding parts onto the stationary part.

Furthermore, it is preferred that the swivel mechanism of the linear drive device be provided with at least one roller, which during tilting or folding of the folding parts is guided by at least one guide track, whereas the most advantageous in terms of overall stability is when during tilting or folding, the roller is guided by an under guide track and/or an upper guide track. Guide tracks are usually located under the frame of the stationary part, whereas they may be widened at their ends to advantage, which facilitates movement of the rollers into the guide track.

In the first phase of folding, at least one guide track ensures the position of the rod. In the second phase, the rotary stop ensures the position. In contrast, when in the unfolding phase, firstly the rotary stop and subsequently at least one guide track ensure the position.

In the preferred arrangement, there is a lateral guide track which increases the safety of roller guidance and further improves the stability of roller movement.

From the viewpoint of ensuring power necessary to perform the folding operation, it is advantageous that the linear drive device be a linear hydraulic drive.

In the working position it is advantageous for the swivel connection of the stationary part to the linear drive device, the linear drive device to the rod, and of the swivel connection to the folding parts to be located below the swivel connection of the stable part and the folding part. This allows for stable positioning of the folding parts in the working position.

The swivel connection of the stationary part and the folding part is preferably located in the upper edge of the frame of the stationary part and in the upper edge of the frame of the folding part so that after folding the folding part by 180° the stationary part and folding part lie adjacent to each other. This enables both stable placement of the folding part in the transport position, and it minimizes the transport dimensions.

As per the invention, the biggest advantage of the device for folding the working part of a agricultural machine according to the design is that the folding mechanism does not increase clearance height of the machine frame, which allows the design of machines with larger frames, which in the transport position meet the requirements for road transport.

As per the invention, the device for folding the working part of an agricultural machine uses the force of gravity so production is simple and inexpensive, and allows, compared to known state of the art technology, achieving further reductions in dimensions for the folding of folding parts, or further increases in the working widths of machines, while maintaining favorable transport dimensions. In addition, the design of the equipment for folding contributes to increased trouble free transportability and thus increasing the overall safety of the machine.

OVERVIEW OF THE FIGURES

The invention will be further elucidated using drawings, in which

Figure 2:
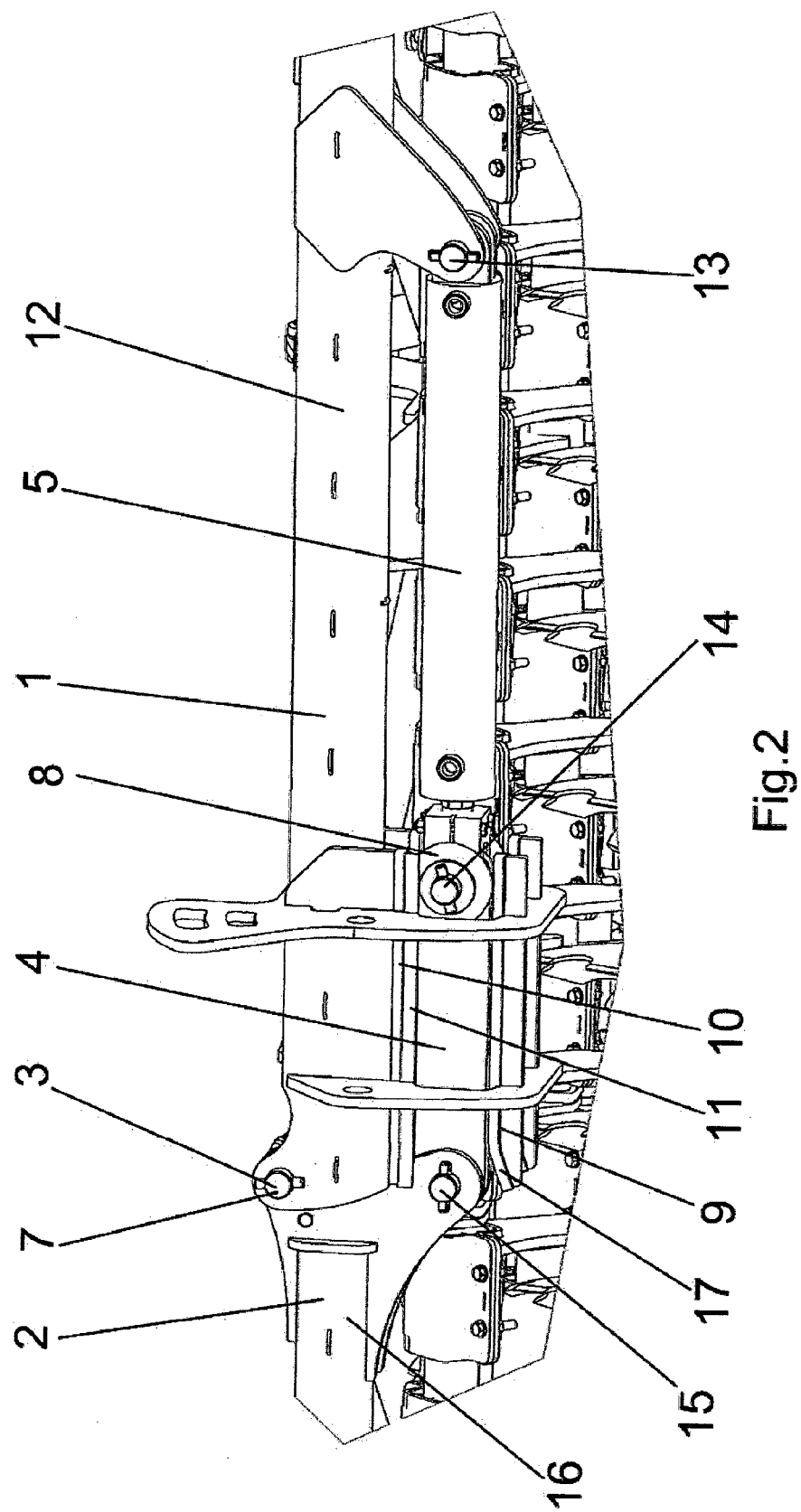
Figure 3:
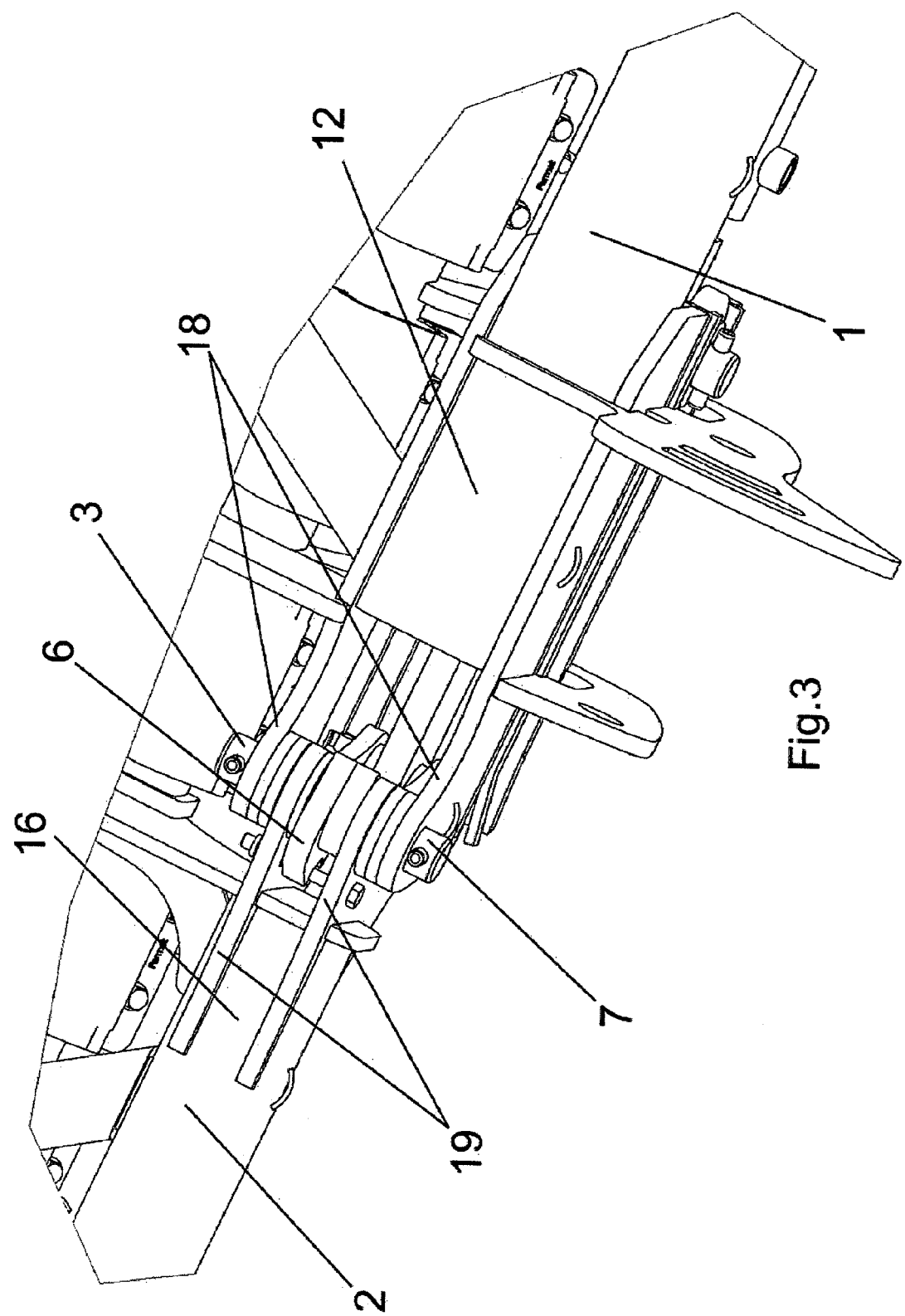
Figure 4:
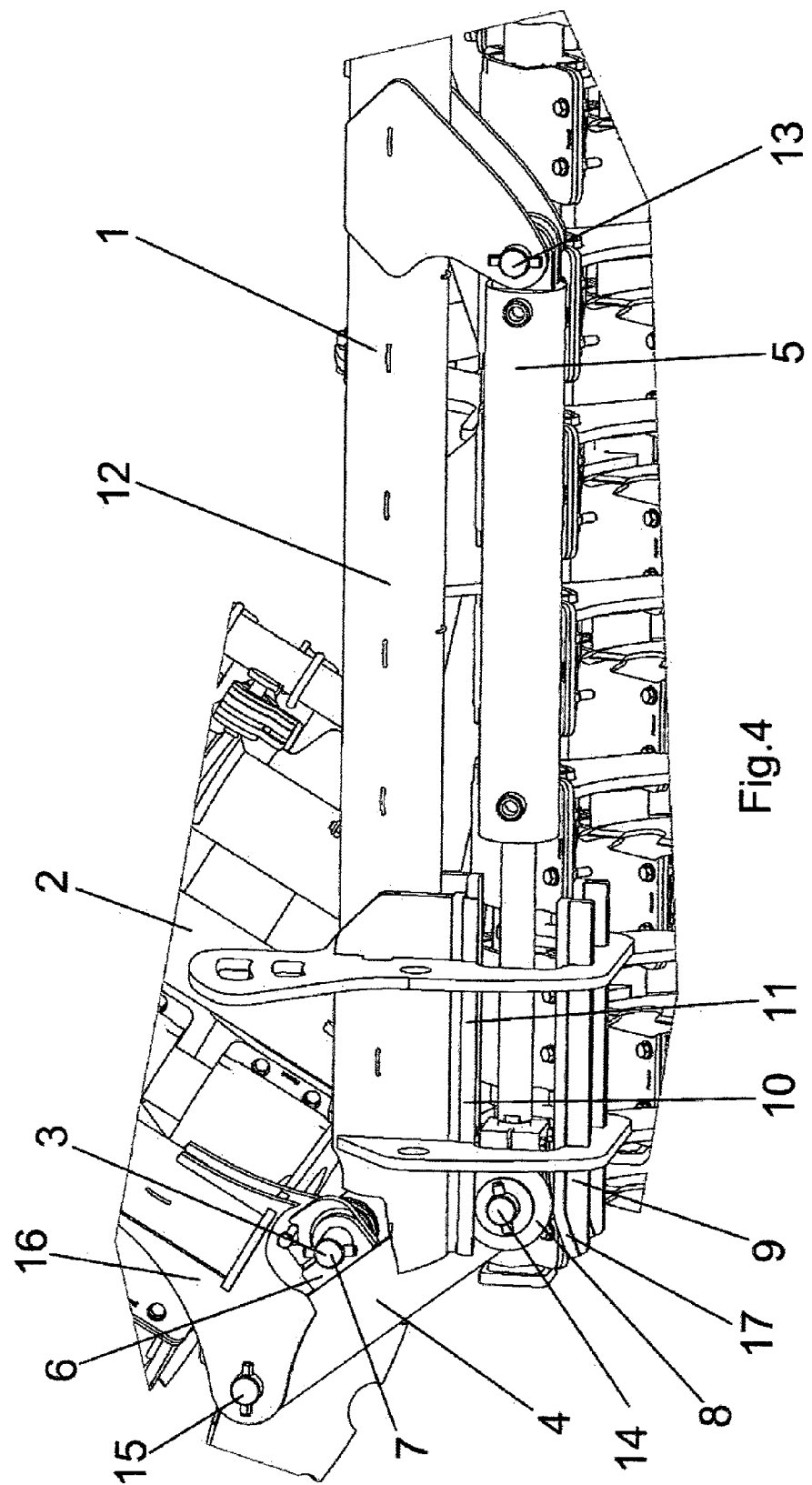
Figure 5:
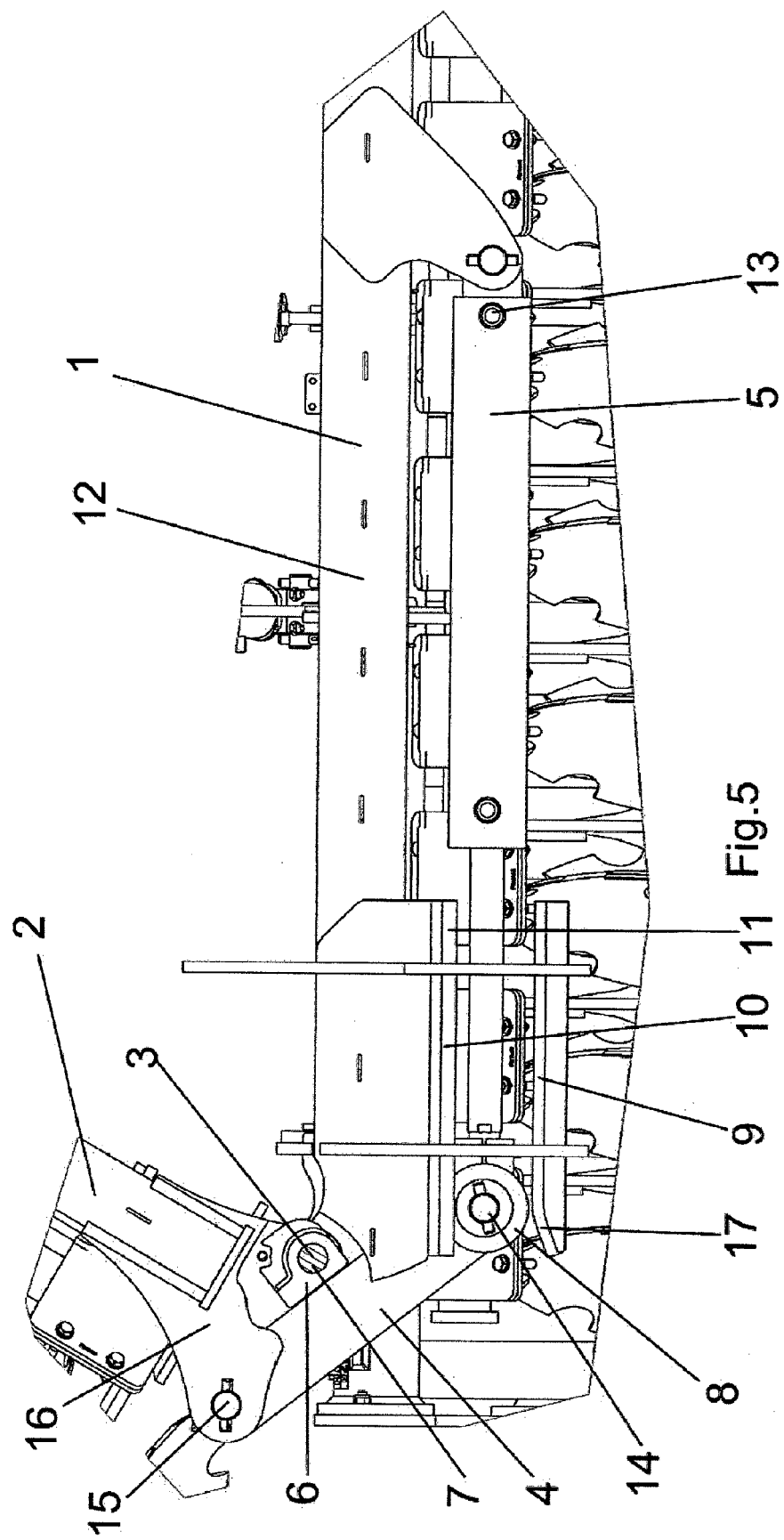
Figure 6:
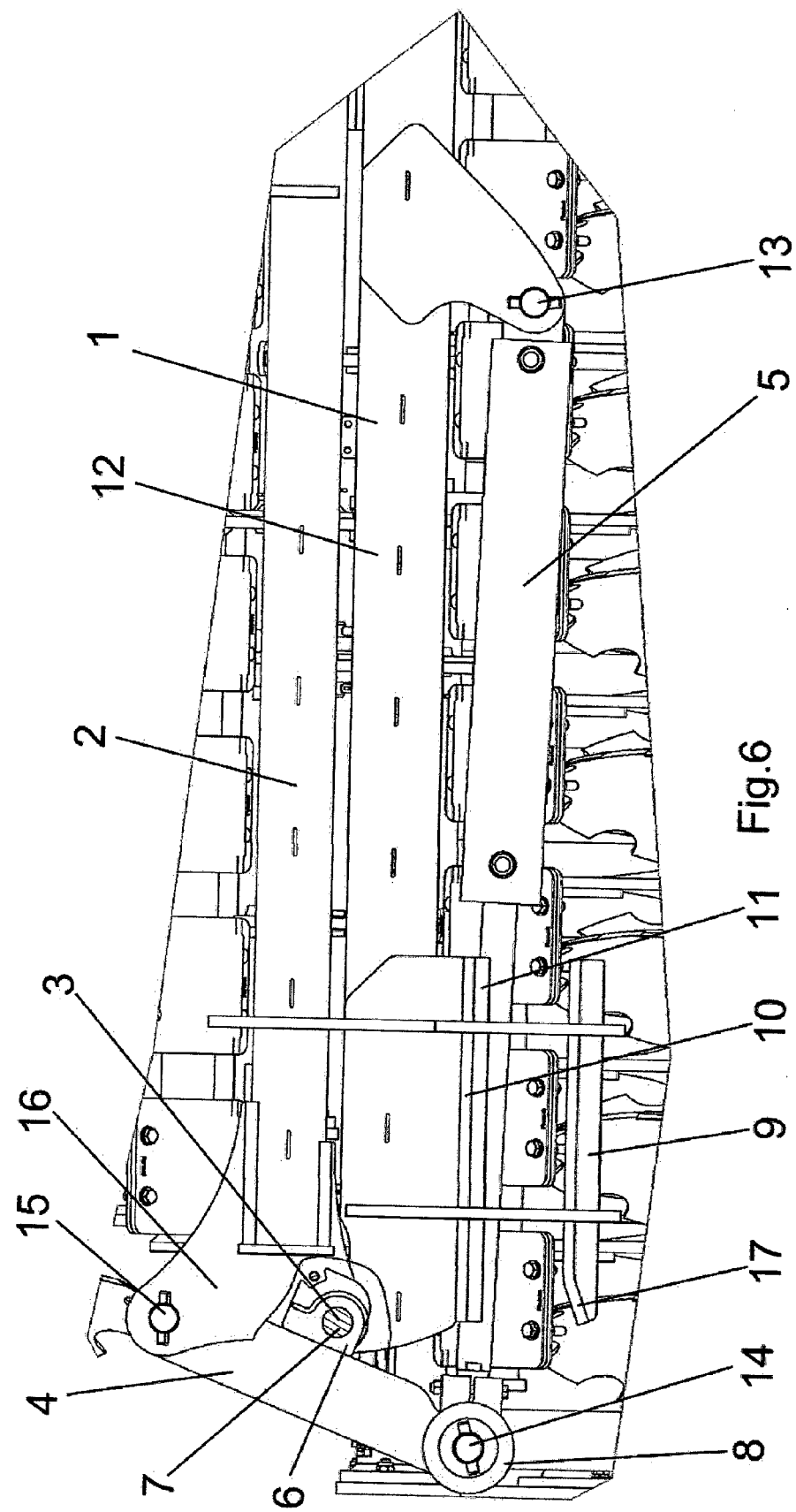
Figure 7:
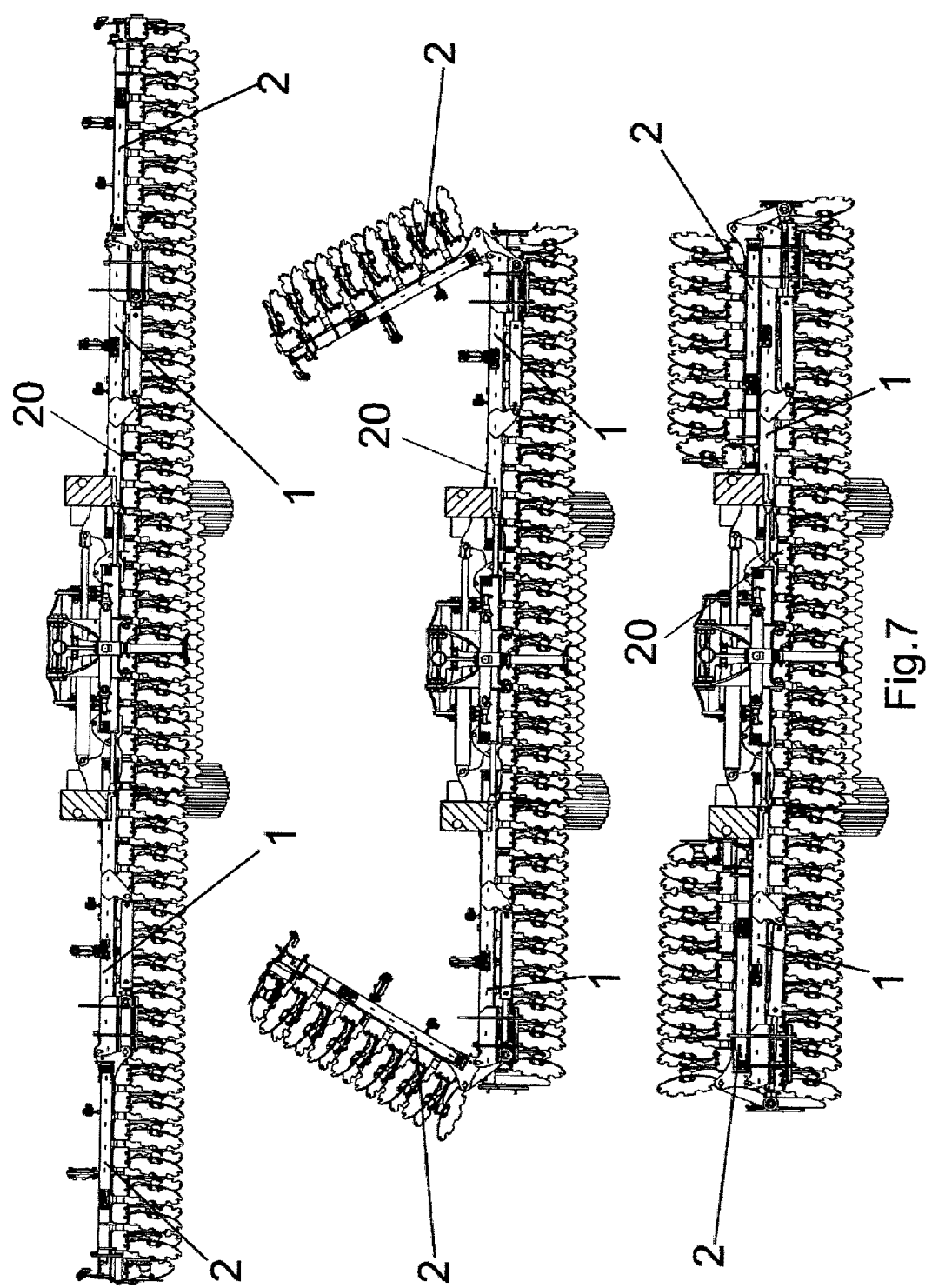

FIG. 1 shows the axonometric view of the overall layout of the agricultural machine with a folding device in the working position, FIG. 2 shows a detailed axonometric view of the device for folding of an agricultural machine in the working position, FIG. 3 shows a close-up axonometric view of a swivel connection for folding the device, FIG. 4 shows a detailed axonometric view with a partial cross-section of the folding device in a partially folded state, FIG. 5 shows a detailed frontal view in partial cross-section of the folding device in a partially folded state, FIG. 6 shows a detailed axonometric view in partial cross-section for tilting the device in a folded state, FIG. 7 shows a frontal view of the general arrangement of an agricultural machine in various stages of folding.

EXAMPLE OF THE PERFORMANCE OF THE INVENTION

The device for folding (FIG. 2, FIG. 4, FIG. 5, FIG. 6) of the working parts of an agricultural machine (FIG. 1, FIG. 7) contains two stationary parts 1 and two folding parts 2 stored in the stationary part 1, whereas the stationary part 1 and folding part 2 are connected by one swivel connection 3 stored in their outer edges. On each of the stationary parts 1 a linear drive device 5 is stored and pivotally connected to a rod 4 which is pivotally connected to the folding part 2. The linear drive device 5 is located under the frame 12 of the stationary part 1.

The shaft 7 of the swivel connection 3 (FIG. 3) is stored in the stationary part 1, by means of plates 18 which are part of the frame 12 of the stationary part 1, and in the folding part 2 is stored by means of plates 19 which are part of the frame 16 of the folding part 2.

The rod 4, during folding or unfolding of the folding part 2, rests upon the rotary stop 6 stored in the stationary part 1. The rod 4 rests upon the rotary stop 6 for half of the folding phase of the folding part 2. In the course of counter motion, the rod 4 rests upon the rotary stop 6 for half of the folding phase of the folding part 2.

The rotary stop 6 is stored on the shaft 7 of swivel connection 3.

The swivel connection of the linear drive device 5 to the rod 4 is provided with a pair of rollers 8, which are, in the course of folding or unfolding of the folding parts 2 conducted by the lower guide track 9 and/or the upper guide track 10. The guide tracks 9,10 are located beneath the frame 12 of the stationary part 1, and contain a lateral guide track 11 and are provided with their ends tapered 17.

The linear drive device 5 is a linear hydraulic drive.

The swivel connection 13 of the stationary part 1 and the linear drive device 5, the swivel connection 14 of the linear drive device 5 to the rod 4 and the swivel connection 15 to the rod 4 to the folding part 2 are in the working position of the folding part 2 located below the swivel connection 3 of the stationary part 1 and the folding part 2.

The swivel connection 3 of the stationary part 1 and the folding part 2 is located in the upper edge of the frame 12 of the stationary part 1 and in the upper edge of the frame 16 of the folding part 2, so that after folding the folding part 2 by 180°, the stationary part 1 and the folding part 2 are lying against each other.

For transition of agricultural machinery from the working to transport position, additional folding may be required. For this, the stationary part 1 becomes movable. And then together with the folding part 2 which is lying upon it, folds onto the central section 20, thus reaching minimum transport dimensions. This folding is usually carried out by equipment for folding which is structurally different from the folding device as described by the invention.

INDUSTRIAL APPLICATION

The device for folding the working parts of agricultural machinery according to the invention can be used for folding the working parts of agricultural machinery, specifically for folding the working parts of agricultural machinery for soil cultivation.

LIST OF REFERENCE MARKS

1 stationary part
2 folding part
3 swivel connection I
4 rod
5 linear drive device
6 rotary stop
7 shaft
8 roller
9 lower guide track
10 upper guide track
11 lateral guide track
12 frame of the stationary part
13 swivel connection II
14 swivel connection III
15 swivel connection IV
16 frame of the folding part
17 end tapered
18 plate I
19 plate II
20 central section

The invention claimed is:

1. A device for use in agricultural machinery, the device including:
   a stationary part and a folding part of the agricultural machinery,
   a first swivel connection including a shaft that pivotally connects an end of the folding part to the stationary part,
   a linear drive device,
   a rod,
   a second swivel connection pivotally connecting a first end of the rod to the folding part,
   a third swivel connection pivotally connecting a second end of the rod to the linear drive device,
   a rotary stop rotatably disposed on the shaft of the first swivel connection, the rod and rotary stop being relatively positioned such that an intermediate portion of the rod between its first and second ends will rest on the rotary stop during the course of folding and unfolding of the folding part relative to the stationary part, and
   at least one guide track on the stationary part, and
   wherein the third swivel connection is provided with at least one roller which is guided by the guide track during folding or unfolding of the folding part.

2. The device according to claim 1, wherein the at least one guide track includes a lower guide track and an upper guide track that guide the roller therebetween.

3. The device according to claim 1, wherein the at least one guide track includes a lateral track guide.

4. The device according to claim 1, wherein the linear drive device is a linear hydraulic drive.

5. The device according to claim 1, wherein the second and third swivel connections located below the first swivel connection when the folding part is in an unfolded working position.

6. The device according to claim 1, wherein the stationary part and the folding part have respective frames, and the first swivel connection is located in upper regions of the frames of the stationary part and folding part so that after unfolding the folding part by 180°, the stationary part and the folding part lie adjacent to each other.

7. The device according to claim 1, wherein the stationary part has a frame and the linear drive device is located at an underside of the frame of the stationary part.

\* \* \* \* \*